United States Patent [19]
Spotts, Jr.

[11] Patent Number: 6,030,475
[45] Date of Patent: Feb. 29, 2000

[54] SYSTEM FOR AND METHOD OF APPLYING A SEALANT STRIP TO SHEET MATERIAL

[75] Inventor: Richard D. Spotts, Jr., Renfrew, Pa.

[73] Assignee: Billco Manufacturing Inc., Zelienople, Pa.

[21] Appl. No.: 09/039,023

[22] PCT Filed: Oct. 23, 1996

[86] PCT No.: PCT/US96/17179

§ 371 Date: Mar. 13, 1998

§ 102(e) Date: Mar. 13, 1998

[87] PCT Pub. No.: WO97/15445

PCT Pub. Date: May 1, 1997

Related U.S. Application Data

[60] Provisional application No. 60/005,804, Oct. 23, 1995.

[51] Int. Cl.$^7$ ...................................................... B32B 31/04
[52] U.S. Cl. .............................. 156/64; 156/367; 414/676
[58] Field of Search ..................................... 156/576, 574, 156/109, 560, 244.18, 244.11, 244.22, 107, 382, 64, 367, 368; 425/113; 414/754, 779, 780, 783, 816, 676; 198/434; 269/21, 69

[56] References Cited

U.S. PATENT DOCUMENTS

| | | | |
|---|---|---|---|
| 4,519,962 | 5/1985 | Schlienkamp | 264/40.7 |
| 5,246,331 | 9/1993 | Hallahan et al. | 414/676 |

*Primary Examiner*—Richard Crispino
*Assistant Examiner*—George R. Koch, III
*Attorney, Agent, or Firm*—James L. Sherman

[57] ABSTRACT

A sealant strip applying system (10) is for applying a sealant strip (12) to a top surface of a sheet material (16) adjacent to a plurality of straight edges (18, 20) thereof. The system (10) is configured to support the sheet material (16) and to produce the controlled repositioning thereof on an air flotation table (30) with each edge (18, 20) being selectively aligned with a front edge (34) of the table (30). The sealant strip (12) is successively applied to each edge (18, 20) by a sealant strip applicator (50) that is supported by the air flotation table (30) and mounted for selective movement along the front edge (34) thereof.

26 Claims, 8 Drawing Sheets

SYSTEM FOR AND METHOD OF APPLYING A SEALANT STRIP TO SHEET MATERIAL

This application claims priority from Provisional Application number 60/005,804, filed Oct. 23,1995.

TECHNICAL FIELD

This invention relates to a system for applying a sealant strip to a surface of a sheet material adjacent to a plurality of straight edges thereof and, more specifically, to such a system which supports, positions and aligns a sheet of glass on an air flotation table as the sealant strip is successively applied to each edge by a sealant strip applicator that is mounted on and supported by the air flotation table.

BACKGROUND ART

It is well known in the manufacture of glass units for placement within windows and door frames to use single or multi-pane units that include insulating material at the peripheral edges thereof. One conventional method of making a double-glazed insulated glass panel consists of manually applying an adhesive strip along the peripheral edges of a glass sheet and then positioning a second glass sheet thereupon to form the panel.

One type of strip used in such a system is manufactured by TREMCO MANUFACTURING under the trademark "Swiggle Strip". This preferred sealant strip is an adhesive strip which is formed of an extruded butyl-based material of a thermoplastic compound which contains a reinforcing aluminum spacer to withstand the forces applied perpendicularly to the sheets of glass that are eventually joined together with the sealant strip therebetween.

Typically, the swiggle strip is applied to the first sheet of glass by a hand held applicator device such as that shown in U.S. Pat. No. 5,013,377. The device is adapted to move on a support table and to generally remain in an upright position but the proper application of the sealant strip requires skill and attention.

U.S. Pat. No. 5,246,331 discloses an air flotation assembly table that allows a sheet of glass to be conveniently moved and aligned toward a front working area. However, the application of the strip along the edges of a sheet of glass still requires skill and attention for the strip be properly positioned and aligned. If not done properly, the strip might be positioned inwardly from the edge in some locations and would be unacceptable if it appears uneven at the edge of the framing material after assembly. There is particularly concern during the application of the strip at the corners to insure that the strip is applied at a tight right angle. If not, the strip will be clearly seen after assembly.

U.S. Pat. No. 5,433,818 discloses apparatus for turning a sheet-like workpiece, e.g. a rectangular sheet of glass, and for applying a sealing strip continuously along its edges. The apparatus includes an air flotation support bed covered by an air-permeable mat, a sealing strip applicator in a carriage, suction cup assemblies mounted for movement on respective mutually perpendicular slides for gripping the sheet at two adjacent corners thereof. The movement of the assemblies is co-ordinated such that, while gripping the sheet, one assembly is moved towards the initial position of the other assembly and simultaneously the latter is moved towards the corner diagonally opposite that at which the first assembly was initially disposed.

While the apparatus of U.S. Pat. No. 5,433,818 attempts to automatically apply the sealing strip to the edges of a sheet of glass, the overall configuration is quite complicated and would be relatively expensive to provide. Additionally, the overall configuration is such that only rectangular sheets of glass can be employed. Because of the obvious limitations of this and other devices in the prior art, there remains a need for any system that can be employed to conveniently and reliably apply a sealant strip to a sheet of glass that includes any number of straight edges with corners therebetween. Such a system should be able to work effectively around corners that need not be at right angles as is required with the apparatus of U.S. Pat. No. 5,433,818.

DISCLOSURE OF INVENTION

It is an object of the present invention to provide a sealant strip application system that assures that the strip will remain aligned with the straight edges of a sheet of glass and that the strip is properly and reliably bent at the corners of the sheet of glass which corners may be at any angle.

It is another object of the invention to provide a system of the type described which can be conveniently and rapidly employed without the skill and attention which was heretofore needed for applying the strips with the prior art hand-held applicators.

These and other objects of the invention are provided in a preferred embodiment thereof which includes a sealant strip application system for applying a sealant strip to a surface of a sheet of glass adjacent to a plurality of straight edges of the sheet of glass, each adjacent pair of which intersect at a corner. The plurality of edges include a first edge and an adjacent second edge. The first edge has a first corner at a terminal end thereof and a second corner at the other terminal end thereof. The second edge has the second corner at a terminal end thereof adjacent the first edge and a third corner at the other terminal end thereof. The sealant strip application system includes a support table having an upper surface and a straight front edge. The upper surface is for supporting the sheet of glass at a lower surface thereof which is opposite the surface. The upper surface has an elongated opening therethrough which extends at an angle with respect to the front edge of the support table. A vacuum cup device is mounted relative to the support table to extend through the elongated opening in alignment with the upper surface and for movement along the elongated opening toward and away from the front edge. A gripping vacuum force is for being selectively applied by the vacuum cup device to the lower surface of the sheet of glass for gripping the sheet of glass in a central region thereof without allowing any relative movement between the vacuum cup device and the sheet of glass throughout the application of the sealant strip to the surface of the sheet of glass. A sealant strip applicator is mounted on the support table for movement along the front edge. A device is provided for feeding the sealant strip to the sealant strip applicator. The sealant strip applicator has selective strip applying components for being activated to apply the sealant strip to the surface of the sheet of glass and for being deactivated to discontinue the application of the sealant strip to the surface of the sheet of glass. A variable coupling element is between the sealant strip applicator and the vacuum cup device. The variable coupling element includes selective coupling components for being activated to establish a fixed distance of the sealant strip applicator from the vacuum cup device and a fixed direction of the sealant strip applicator from the vacuum cup device and for being deactivated to allow a variable distance and a variable direction of the sealant strip applicator from the vacuum cup device. The sealant strip applicator is for being initially positioned at the first corner of the sheet of glass when the first edge is parallel to and in alignment with the front edge of the support table. The selective coupling components are for being deactivated and the selective strip applying components are for being activated when the sealant strip applicator is positioned at the first corner. The sealant strip applicator is for being moved relative to the front edge of the support table in a first direction from the first corner toward the second corner of the sheet of glass as the sealant strip is applied to the surface adjacent to the first edge when the selective coupling components are deactivated and the selective strip applying components are activated. The sealant strip applicator is for being positioned at the second corner of the sheet of glass after the application of the sealant strip along the first edge of the sheet of glass. The selective coupling components are for being activated and the selective strip applying components are for being deactivated when the sealant strip applicator is positioned at the second corner. The sealant strip applicator is for being moved in a second direction opposite the first direction relative to the front edge, after activation of the selective coupling components and deactivation of the selective strip applying components, to cause the vacuum cup device to rotate the sheet of glass on the upper surface of the support table about the central region until the second edge is in general alignment with the front edge of the support table as the vacuum cup device initially moves along the elongated opening away from the front edge and then moves along the elongated opening toward the front edge. The selective coupling components are for being deactivated and the selective strip applying components are for being activated when the second edge is parallel to and in alignment with the front edge and the sealant strip applicator is positioned at the second corner for being moved relative to the front edge of the support table in the first direction toward the third corner of the sheet of glass for the application of the sealant strip to the surface of the sheet of glass adjacent to and along the second edge.

The preferred sealant strip application system can include the sealant strip applicator having a bending pin extending toward the surface of the sheet of glass in a direction generally perpendicular thereto at a side of the sealant strip away from the front edge of the support table. The bending pin is for bending the sealant strip at the second corner of the sheet of glass as the sealant strip applicator is moved in the second direction.

The sealant strip application system may also include the sealant strip applicator having a handle for moving the sealant strip applicator in the first and second directions.

The preferred sealant strip application system can further include a normally open switch associated with the selective coupling components and the selective strip applying components. The normally open switch is for being open to cause deactivation of the selective coupling components and activation of the selective strip applying components and is for being closed to cause activation of the selective coupling components and deactivation of the selective strip applying components. The sealant strip applicator can include selective pressure applying components for selectively applying a downward pressure to the sealant strip to assist in the application of the sealant strip to the surface of the sheet of glass. The normally open switch is open to cause the downward pressure and is for being closed to prevent the downward pressure by the selective pressure applying components.

The preferred sealant strip application system may also include the support table having selective alignment retaining components for retaining the first edge of the sheet of glass parallel to and in alignment with the front edge when the sealant strip applicator is being moved in the first direction and for allowing the rotation of the sheet of glass when the sealant strip applicator is being moved in the second direction. The preferred selective alignment retaining components include a squaring gate disposed adjacent the front edge for making contact with the first edge of the sheet of glass at separated locations therealong when the sealant strip applicator is moved in the first direction and for being disposed outwardly of and separated from the front edge when the sealant strip applicator is moved in the second direction.

The sealant strip application system can include the sealant strip applicator having a handle for moving the sealant strip applicator in the first and the second directions with the normally open switch being located on the sealant strip applicator adjacent to the handle.

The preferred sealant strip application system can further include vacuum cup biasing components for initial biasing the movement of the vacuum cup device and the central region of the sheet of glass in a third direction along the elongated opening away from the front edge and for subsequently biasing the movement of the vacuum cup device and the central region of the sheet of glass in a fourth direction opposite the third direction along the elongated opening toward the front edge. With the elongated opening extending perpendicular to the front edge, a control element for the vacuum cup biasing components is for beginning the initial biasing of the movement in the third direction when the selective coupling components are activated, for discontinuing the initial biasing and beginning the subsequent biasing of the movement in the fourth direction when the sealant strip applicator is located along the front edge in perpendicular alignment with the vacuum cup device during the movement of the sealant strip applicator in the second direction, and for discontinuing the subsequent biasing when the selective coupling components are deactivated. The control element includes a proximity switch disposed below the front edge of the support table to sense when the sealant strip applicator is located along the front edge in the perpendicular alignment with the vacuum cup device.

The preferred sealant strip application system can include the selective coupling components having a vacuum cup fitting in a lower region of the support table opposite the upper surface and a connecting rod element extending from the sealant strip applicator to the vacuum cup fitting in the lower region of the support table. The vacuum cup fitting has a rotary brake portion for selective rotation thereof relative to the vacuum cup device and a linear brake portion. The connecting rod element has an applicator end and a vacuum cup end. The applicator end is pivotally joined to the sealant strip applicator at a lower portion thereof below the upper surface and the front edge of the support table. The vacuum cup end is mounted for selective linear movement within the linear brake portion of the vacuum cup fitting. The rotary brake portion is activated to prevent the selective rotation of the vacuum cup fitting relative to the vacuum cup device and the linear brake portion is activated to prevent the selective linear movement of the vacuum cup end of the connecting rod element within the linear brake portion during the activation of the selective coupling components. The sealant strip application system can further include a normally open switch associated with the selective coupling components and the selective strip applying components. The normally open switch is open to cause deactivation of the rotary brake portion and the linear brake portion of the vacuum cup fitting and activation of the selective strip applying components and is closed to cause activation of the rotary brake portion and the linear brake portion of the vacuum cup fitting and deactivation of the selective strip applying components. The sealant strip applicator can include a handle for moving the sealant strip applicator in the first and the second directions with the normally open switch being located on the sealant strip applicator adjacent to the handle.

Another preferred embodiment of the invention includes a sealant strip application system for applying a sealant strip to a surface of a sheet of glass adjacent to a plurality of straight edges of the sheet of glass. Each adjacent pair of the plurality of edges intersects at a corner. The plurality of edges of the sheet of glass include a first edge and an adjacent second edge. The first edge has a first corner at a terminal end thereof and a second corner at the other terminal end thereof. The second edge has the second corner at a terminal end thereof adjacent the first edge and a third corner at the other terminal end thereof. The sealant strip application system includes a support table having an upper surface and a straight front edge. The upper surface is for supporting the sheet of glass at a lower surface thereof which is opposite the surface. The upper surface has an elongated opening therethrough which extends at an angle with respect to the front edge of the support table. A vacuum cup device is mounted relative to the support table to extend through the elongated opening in alignment with the upper surface and for movement along the elongated opening toward and away from the front edge. A gripping vacuum force is for being selectively applied by said vacuum cup device to the lower surface of the sheet of glass for gripping the sheet of glass in a central region thereof without allowing any relative movement between the vacuum cup device and the sheet of glass throughout the application of the sealant strip to the surface of the sheet of glass. A sealant strip applicator is mounted on the support table for movement along the front edge. A device is provided for feeding the sealant strip to the sealant strip applicator. The sealant strip applicator has selective strip applying components for being activated to apply the sealant strip to the surface of the sheet of glass and for being deactivated to discontinue the application of the sealant strip to the surface of the sheet of glass. A variable coupling element is between the sealant strip applicator and the vacuum cup device. The variable coupling element includes selective coupling components for being activated to establish a fixed distance of the sealant strip applicator from the vacuum cup device and a fixed direction of the sealant strip applicator from the vacuum cup device and for being deactivated to allow a variable distance and a variable direction of the sealant strip applicator from the vacuum cup device. The sealant strip applicator is for being initially positioned at the first corner of the sheet of glass when the first edge is parallel to and in alignment with the front edge of the support table. The selective coupling components are for being deactivated and the selective strip applying components are for being activated when the sealant strip applicator is positioned at the first corner. The sealant strip applicator is for being moved relative to the front edge of the support table in a first direction from the first corner toward the second corner of the sheet of glass as the sealant strip is applied to the surface adjacent to the first edge when the selective coupling components are deactivated and the selective strip applying components are activated. The sealant strip applicator is for being positioned at the second corner of the sheet of glass after the application of the sealant strip along the first edge of the sheet of glass. The selective coupling components are for being activated and the selective strip applying components are for being deactivated when the sealant strip applicator is positioned at the second corner. The sealant strip applicator is for being moved in a second direction opposite the first direction relative to the front edge, after activation of the selective coupling components and deactivation of the selective strip applying components, to cause the vacuum cup device to rotate the sheet of glass on the upper surface of the support table about the central region until the second edge is in general alignment with the front edge of the support table as the vacuum cup device initially moves along the elongated opening away from the front edge and then moves along the elongated opening toward the front edge. The selective coupling components are for being deactivated and the selective strip applying components are for being activated when the second edge is parallel to and in alignment with the front edge and the sealant strip applicator is positioned at the second corner for being moved relative to the front edge of the support table in the first direction toward the third corner of the sheet of glass for the application of the sealant strip to the surface of the sheet of glass adjacent to and along the second edge. The sealant strip applicator has a bending pin extending toward the surface of the sheet of glass in a direction generally perpendicular thereto at a side of the sealant strip away from the front edge of the support table. The bending pin is for bending the sealant strip at the second corner of the sheet of glass as the sealant strip applicator is moved in the second direction. A normally open switch associated with the selective coupling components and the selective strip applying components is for being open to cause deactivation of the selective coupling components and activation of the selective strip applying components and for being closed to cause activation of the selective coupling components and deactivation of the selective strip applying components. Selective alignment retaining components are for retaining the first edge of the sheet of glass parallel to and in alignment with the front edge when the sealant strip applicator is being moved in the first direction and for allowing the rotation of the sheet of glass when the sealant strip applicator is being moved in the second direction.

The preferred sealant strip application system can include the selective coupling components having a vacuum cup fitting in a lower region of the support table opposite the upper surface and a connecting rod element extending from the sealant strip applicator to the vacuum cup fitting in the lower region of the support table. The vacuum cup fitting has a rotary brake portion for selective rotation thereof relative to the vacuum cup device and a linear brake portion. The connecting rod element has an applicator end and a vacuum cup end. The applicator end is pivotally joined to the sealant strip applicator at a lower portion thereof below the upper surface and the front edge of the support table. The vacuum cup end is mounted for selective linear movement within the linear brake portion of the vacuum cup fitting. The rotary brake portion is activated to prevent the selective rotation of the vacuum cup fitting relative to the vacuum cup device and the linear brake portion is activated to prevent the selective linear movement of the vacuum cup end of the connecting rod element within the linear brake portion during the activation of the selective coupling components. The sealant strip application system can further include a normally open switch associated with the selective coupling components and the selective strip applying components. The normally open switch is open to cause deactivation of the rotary brake portion and the linear brake portion of the vacuum cup fitting and activation of the selective strip applying components and is closed to cause activation of the rotary brake portion and the linear brake portion of the vacuum cup fitting and deactivation of the selective strip applying components.

The preferred sealant strip application system can further include vacuum cup biasing components for initially biasing the movement of the vacuum cup device and the central region of the sheet of glass in a third direction along the elongated opening away from the front edge and for subsequently biasing the movement of the vacuum cup device and the central region of the sheet of glass in a fourth direction opposite the third direction along the elongated opening toward the front edge. With the elongated opening extending perpendicular to the front edge, a control element for the vacuum cup biasing components is for beginning the initial biasing of the movement in the third direction when the selective coupling components are activated, for discontinuing the initial biasing and beginning the subsequent biasing of the movement in the fourth direction when the sealant strip applicator is located along the front edge in perpendicular alignment with the vacuum cup device during the movement of the sealant strip applicator in the second direction, and for discontinuing the subsequent biasing when the selective coupling components are deactivated.

A preferred method of the invention is for applying a sealant strip to a surface of a sheet of glass adjacent to a plurality of straight edges of the sheet of glass. Each adjacent pair of the plurality of edges intersects at a corner. The plurality of edges of the sheet of glass includes a first edge and an adjacent second edge. The first edge has a first corner at a terminal end thereof and a second corner at the other terminal end thereof. The second edge has the second corner at a terminal end thereof adjacent the first edge and a third corner at the other terminal end thereof. The method includes the steps of:

supporting the sheet of glass at a lower surface thereof which is opposite the surface on an upper surface of a support table having a straight front edge;

gripping the lower surface of the sheet of glass in a central region thereof to allow limited movement of the central region toward and away from the front edge along a path which is at an angle with respect to the front edge;

mounting a sealant strip applicator on the support table for movement along the front edge;

selectively applying the sealant strip to the surface of the sheet of glass with the sealant strip applicator;

selectively discontinuing the application of the sealant strip to the surface of the sheet of glass by the sealant strip applicator;

selectively coupling the sealant strip applicator and the central region of the lower side of the sheet of glass to establish a fixed distance of the sealant strip applicator from the central region and a fixed direction of the sealant strip applicator from the central region;

selectively uncoupling the sealant strip applicator and the central region of the lower side of the sheet of glass to allow a variable distance and a variable direction of the sealant strip applicator from the central region;

initially positioning the sealant strip applicator at the first corner of the sheet of glass when the first edge is parallel to and in alignment with the front edge of the support table during the selective uncoupling;

initially moving the sealant strip applicator relative to the front edge of the support table in a first direction from the first corner toward the second corner of the sheet of glass during the selectively applying the sealant strip to the surface adjacent to the first edge;

subsequently positioning the sealant strip applicator at the second corner of the sheet of glass after the selectively applying the sealant strip along the first edge of the sheet of glass;

subsequently moving the sealant strip applicator in a second direction opposite the first direction relative to the front edge, during the selectively coupling and the selectively discontinuing the application of the sealant strip, to cause rotating of the sheet of glass around the central region on the upper surface of the support table until the second edge is generally parallel to the front edge of the support table;

the subsequently moving the sealant strip applicator in the second direction initially causing the central region to move along the path away from the front edge and then to move along the path toward the front edge;

bending the sealant strip at the second corner of the sheet of glass during the subsequently moving the sealant strip applicator in the second direction; and repeating the steps of selectively uncoupling and selectively applying the sealant strip to the surface of the sheet of glass adjacent to and along the second edge when the sealant strip applicator is positioned at the second corner for repeating the initially moving the sealant strip applicator relative to the front edge of the support table in the first direction toward the third corner when the second edge is parallel to and in alignment with the front edge.

The preferred method of applying the sealant strip can further include the step of retaining the first edge of the sheet of glass parallel to and in alignment with the front edge during the initially moving the sealant strip applicator in the first direction.

The preferred method of applying the sealant strip can also include the steps of initial biasing the central region of the sheet of glass in a third direction along the path away from the front edge and subsequently biasing the central region of the sheet of glass in a fourth direction opposite the third direction along the path toward the front edge during the subsequently moving the sealant strip applicator in the second direction. The initially biasing of the central region in the third direction is perpendicular to the first direction and the second direction.

Additionally, in the preferred method of applying the sealant strip, the step of gripping can include:

providing an elongated opening through the upper surface of the support table which elongated opening extends along the path at an angle with respect to the front edge of the support table;

mounting a vacuum cup device relative to the support table to extend through the elongated opening in alignment with the upper surface and for movement in the elongated opening along the path toward and away from the front edge; and the gripping of the lower surface of the sheet of glass in the central region being provided by the vacuum cup device without allowing any relative movement between the vacuum cup device and the central region of the sheet of glass throughout the applying the sealant strip to the surface of the sheet of glass and the discontinuing the application of the sealant strip to the surface of the sheet of glass. The step of providing the elongated opening can include extending the elongated opening along the path which is perpendicular to the front edge of the support table.

Still further, in the preferred method of applying the sealant strip, the step of coupling can include:

providing a vacuum cup fitting in a lower region of the support table opposite the upper surface and a connecting rod extending from the sealant strip applicator to the vacuum cup fitting in the lower region of the support table, the vacuum cup fitting having a rotary brake portion for selective rotation thereof relative to the vacuum cup device and a linear brake portion, and the connecting rod having an applicator end and a vacuum cup end;

pivotally joining the applicator and to the sealant strip applicator at a lower portion thereof below the upper surface and the front edge of the support table;

mounting the vacuum end for selective linear movement within the linear brake portion of the vacuum cup fitting; and activating the rotary brake portion to prevent the selective rotation of the vacuum cup fitting relative to the vacuum cup device and activating the linear brake portion to prevent the selective linear movement of the vacuum cup end of the connecting rod within the linear brake portion during the subsequently moving the sealant strip applicator in the second direction.

BEST MODE FOR CARRYING OUT THE INVENTION

Figure 1:
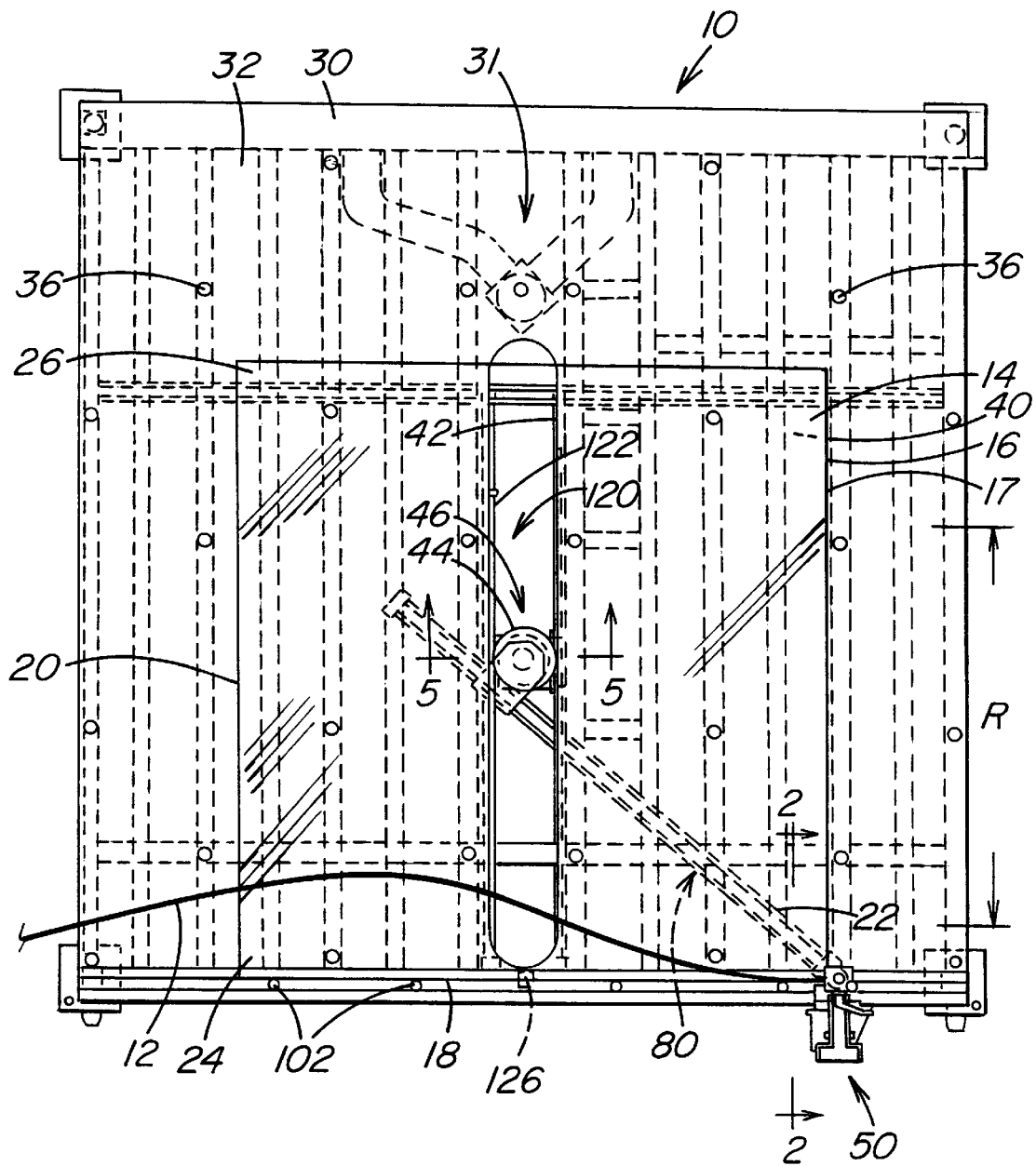
FIG. 1 is a top view of a preferred support table which supports a sheet of glass for the application of a sealant strip thereon including various features of the invention.

As seen in FIG. 1, a preferred sealant strip application system 10 is for applying a sealant strip 12 to a top surface 14 of a sheet of glass 16 adjacent to a plurality of straight edges of the sheet of glass, each adjacent pair of which intersect at a corner. The plurality of edges include a first edge 18 and an adjacent second edge 20. The first edge 18 has a first corner 22 at a terminal end thereof and a second corner 24 at the other terminal end thereof. The second edge 20 has the second corner 24 at a terminal end thereof adjacent the first edge 18 and a third corner 26 at the other terminal end thereof.

The sealant strip application system 10 includes a support table 30 having an upper surface 32 and a straight front edge 34. The preferred support table 30 is an air flotation type that has an air supply system 31 including a plurality of air supply holes 36 throughout the upper surface 32. The upper surface 32 is for supporting the sheet of glass 16 at a lower surface 40 thereof which is opposite the surface 14. The upper surface 32 has an elongated opening 42 therethrough which extends at an angle with respect to the front edge 34 of the support table 30. While the preferred angle with respect to the front edge 34 is ninety degrees, it should be noted that some features of the invention might be equally provided by the use of an elongated opening 42 that is at an angle that is not perpendicular to the front edge 34. In any case, a vacuum cup device 44 is mounted relative to the support table 30 to extend through the elongated opening 42 in alignment with the upper surface 32 and for movement along the elongated opening 42 toward and away from the front edge 34 within a range R. A gripping vacuum force is for being selectively applied by the vacuum cup device 44 to the lower surface 40 of the sheet of glass 16 for gripping the sheet of glass 16 in a central region 46 thereof without allowing any relative movement between the vacuum cup device 44 and the sheet of glass 16 throughout the application of the sealant strip 12 to the surface 14 of the sheet of glass 16.

Figure 2:
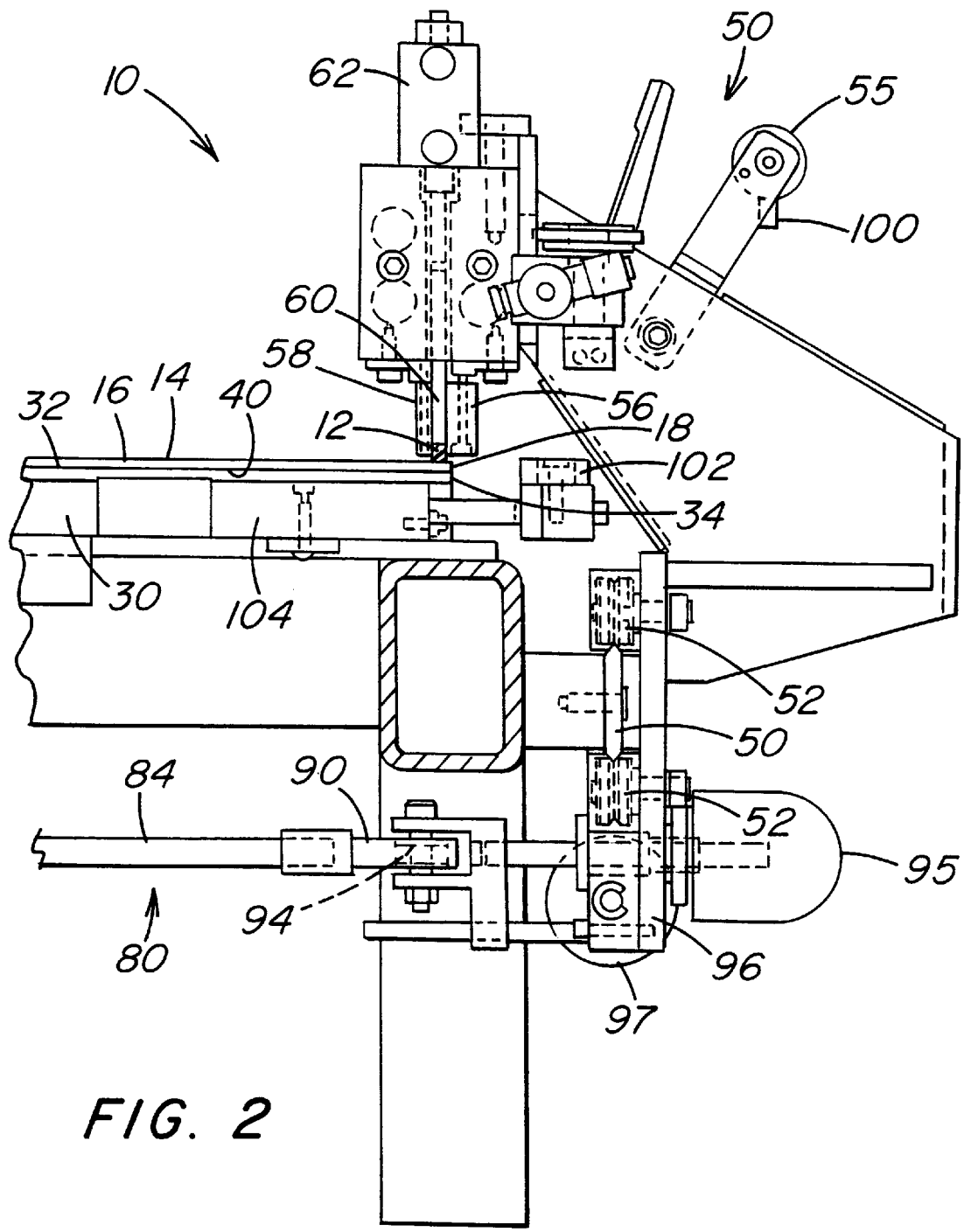
FIG. 2 is a view of the preferred applicator as seen along line 2—2 of FIG. 1.
Figure 4:
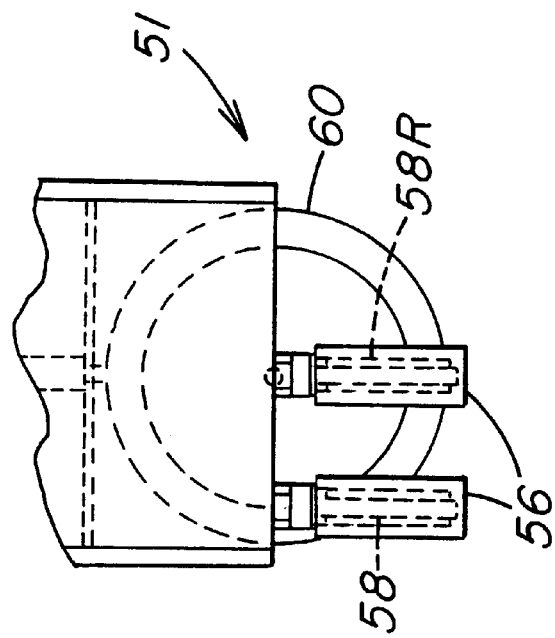
FIG. 4 is a view of the application area as generally seen from the right in FIG. 3.
Figure 3:
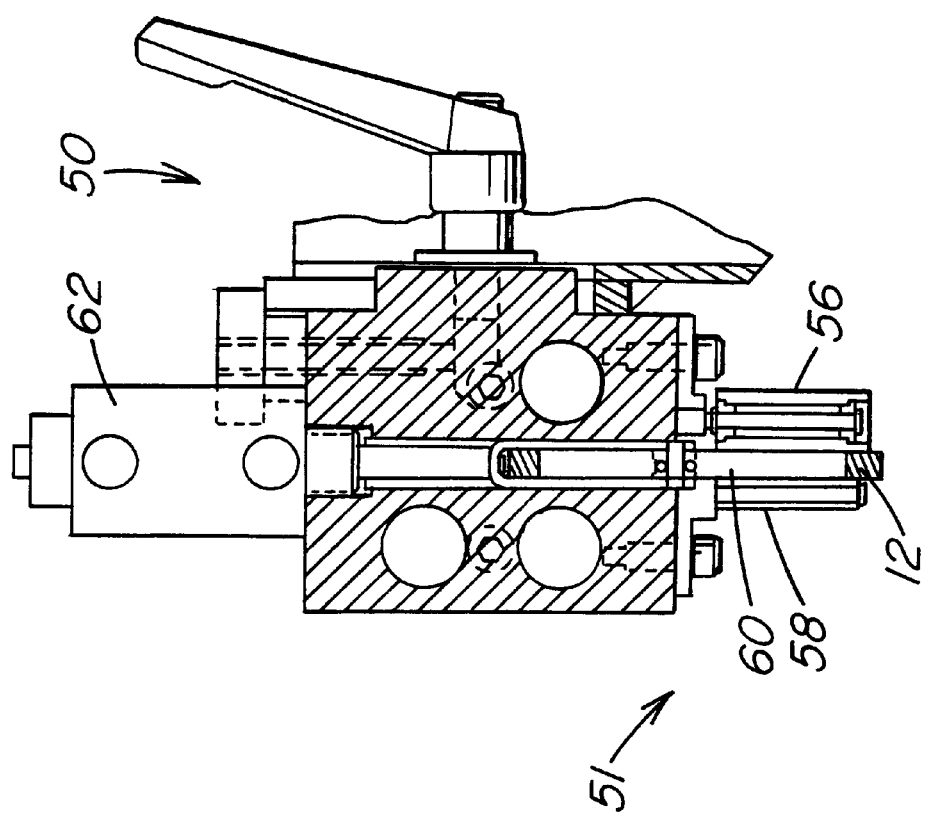
FIG. 3 is a detailed view of the application area of the applicator of FIG. 2.

A sealant strip applicator 50 is mounted on the support table 30 for movement along the front edge 34. A sealant strip supply system (not shown in the drawings but well known to those skilled in the art) is provided for feeding the sealant strip 12 to the sealant strip applicator 50. The sealant strip applicator 50 has selective strip applying components 51 for being activated to apply the sealant strip 12 to the surface of the sheet of glass 16 and for being deactivated to discontinue the application of the sealant strip 12 to the surface of the sheet of glass 12. As best seen in FIGS. 2, 3 and 4, the sealant strip applicator 50 is mounted for movement along the front edge 34 of the table 30 as opposed support wheels 52 ride along a rail 54. The applicator 50 receives the strip 12 at a working region thereof which is aligned with the surface 14 of the sheet of glass 16 adjacent the first edge 18 and is defined by a set of outer rollers 56, inner rollers 58 and a pressure wheel 60. The location of and the distance between the sets of rollers 56, 58 can be adjusted in the applicator 50 according to the size of the strip 12 to be used therein. The pressure wheel 60 is configured to apply a downward force to the strip 12 as it is being applied to insure that it properly adheres to the surface 14. The control of air to the air cylinder 62 for the pressure wheel 60, which is only intended to apply the downward force when the strip is being applied by movement of the applicator 50 in a first direct D1 (FIG. 6) along the front edge 34, will be discussed hereinbelow.

The preferred configuration includes two rollers 56 in the outer set and two rollers 58 in the inner set. As seen in FIG. 4, the rollers 58 are shown to be disposed generally inwardly of the rollers 56. The inward roller 58R, as seen to the right in FIG. 4 and FIG. 9, functions as a bending pin. The bending pin, in the form of the roller 58R, extends toward the surface 14 of the sheet of glass 16 in a direction generally perpendicular thereto at a side of the sealant strip 12 away from the front edge 34 of the support table 30. As will be seen, the bending pin 58R is for bending the sealant strip 12 at each subsequent corner of the sheet of glass 16. The bending occurs when the sealant strip applicator 50 is moved in a second direction D2 (FIGS. 8 and 9), which is opposite the first direction D1, as the sheet of glass 16 is being repositioned for the application of the strip to each edge when it is parallel to and aligned with the front edge 34 of the table 30. As seen in FIG. 9, the relative positions of the rollers 56 and the rollers 58 along the front edge 34 of the table 30 may be selectively adjusted to insure the proper bending of the sealant strip 12 at the corners.

Figure 5:
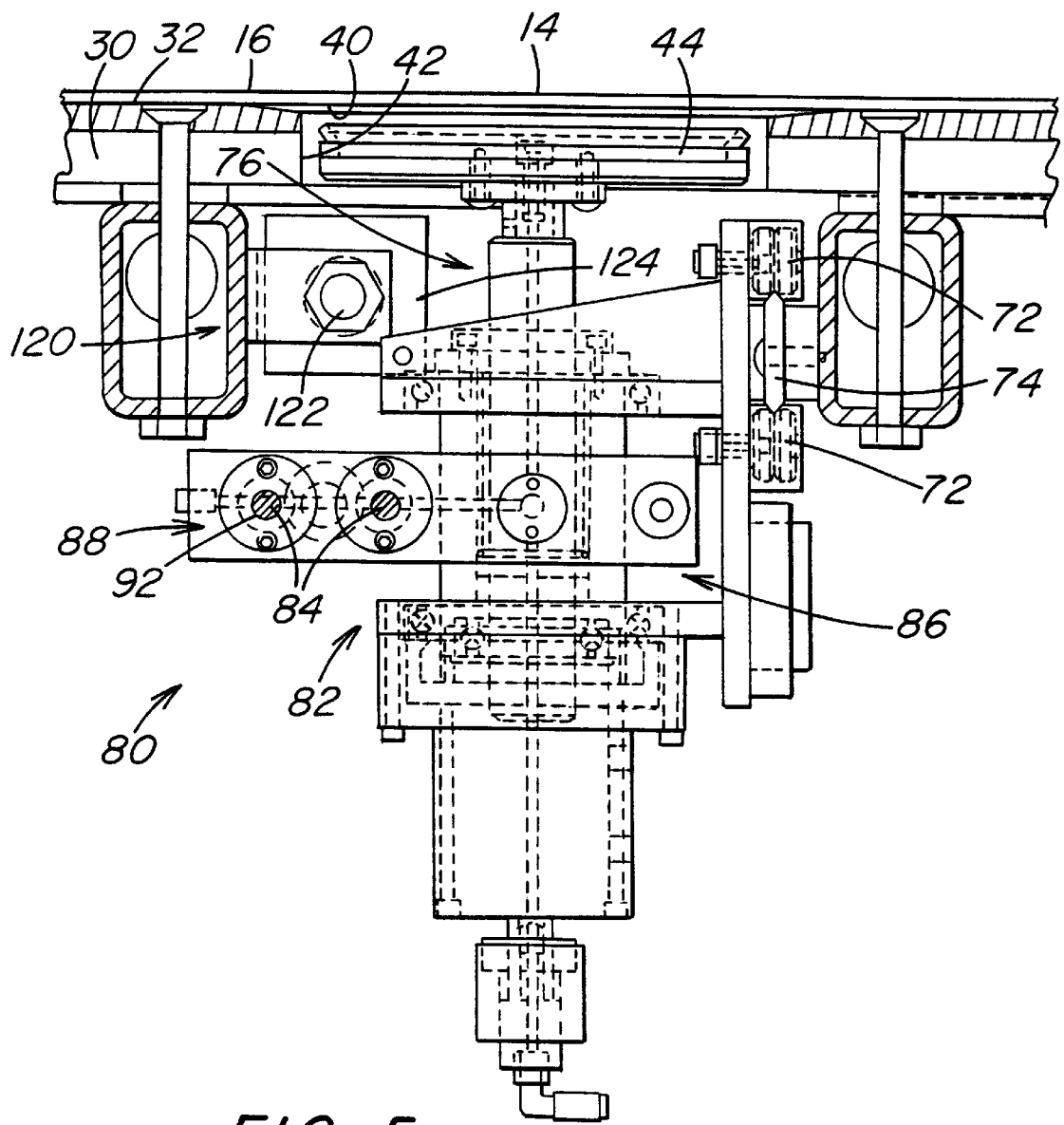
FIG. 5 is a view of the vacuum cup device of the present invention including various features of the invention as seen along the line 5—5 of FIG. 1.

As thus described, if the applicator 50 is moved by use of a handle 55 in a first direction D1 along the front edge 34, the applicator 50 would be able to apply the strip 12 to the surface 14 adjacent to the first edge 18 of the sheet of glass 16 from the first corner 22 to the second corner 24. This movement would be similar to that of U.S. Pat. No. 5,246, 331 discussed above. However, in this prior art device, the sheet of glass 16 would need to be moved, rotated and aligned manually to cause the second edge 20 to be parallel to and in alignment with the front edge 34 for the strip to be applied thereto. With the applicator 50 remaining relatively positioned at the second corner 24 throughout and after the rotation, the applicator 50 could again be moved in the first direction D1 to apply the strip 12 to the second edge 20. As seen in FIG. 5, the vacuum cup element 44 is mounted for motion along the elongated opening 42. Specifically, the vacuum cup device 44 is supported on a carriage 70 having opposed wheels 72 to move along a rail 74. The rail 74 is mounted in a lower region 76 of the support table 30 opposite upper surface 32 to extend, in the preferred arrangement, perpendicular to the front edge 34. Consequently, the vacuum cup device 44 is capable of movement in the elongated opening 42 toward and away from the front edge 34 to generally facilitate the repositioning of the sheet of glass 16 on the upper surface 32 of the support table 30.

However, the preferred system 10 includes controlled means for rotating and moving the sheet of glass 16 to greatly facilitate the application of the strip to each edge of the sheet of glass. As seen in FIGS. 1, 2 and 5, a variable coupling element 80 is mounted between the sealant strip applicator 50 and the vacuum cup device 44. The variable coupling element 80 includes selective coupling components for being activated to establish a fixed distance of the sealant strip applicator 50 from the vacuum cup device 44 and a fixed direction of the sealant strip applicator 50 from the vacuum cup device 44 and for being deactivated to allow a variable distance and a variable direction of the sealant strip applicator 50 from the vacuum cup device 44. As best seen in FIGS. 2 and 5, the selective coupling components include a vacuum cup fitting 82 in the lower region 76 of the support table 30 opposite the upper surface 32 and a connecting rod element 84, including a pair of parallel rods to provide rigidity thereto, which extends from the sealant strip applicator 50 to the vacuum cup fitting 82 in the lower region 76 of the support table 30. The vacuum cup fitting 82 has a rotary brake portion 86 for selective rotation thereof relative to the vacuum cup device 44 and a linear brake portion 88. The connecting rod element 84 has an applicator end 90 and a vacuum cup end 92. The applicator end 90 is pivotally joined to the sealant strip applicator 50 by a pivot pin 94 at a lower portion 96 of the applicator 50 below the upper surface 32 and the front edge 34 of the support table 30. The vacuum cup end 92 of the rod element 84 is mounted for selective linear movement within the linear brake portion 88 of the vacuum cup fitting 82.

The vacuum cup fitting 82 includes an oil reservoir system (not shown) which is operably connected to both the rotary brake portion 86 and the linear brake portion 88 and which is for being selectively pressurized by operating air pressure to increase the pressure of the oil therein. The rotary brake portion 86 is activated by the introduction of air to pressurize the oil in the chamber of the rotary brake portion 86 to apply braking pressure, at relative rotating surfaces thereof, to prevent the selective rotation of the vacuum cup fitting 82 relative to the vacuum cup device 44. Similarly, the linear brake portion 88 is activated by the selective introduction of air to pressurize the oil in a compression fitting to prevent the selective linear movement of the vacuum cup end 92 of the connecting rod element 84 within the linear brake portion 88 during the activation of the selective coupling components. As will be seen in a discussion of the air supply system of FIG. 13, the valve 150 can be selectively positioned to increase the air pressure on the oil in the reservoir system to activate both the rotary brake portion 86 and the linear brake portion 88 at the same time.

In the preferred system 10, it has been found that the pivot pin 94 of the variable coupling element 80 should be in direct alignment with the bending pin 58R of the applicator 50. However, for some strips and for some sheets of glass (perhaps those having a rounded corner) there may be a need to adjust the location of the pivot pin 94 with respect to the applicator 50 and the location of the bending pin 58R around which the strip 12 will be bent at the corners of the sheet of glass. Consequently, the applicator 50 also includes adjusting means 95 and 97, at right angles with respect to each other, to adjust the position of the pivot pin 94 with respect to the applicator 50 and the bending pin 58R.

There are several other features which are incorporated into the preferred sealant strip application system 10 to properly control the position of the sheet of glass throughout the application of the strip to the sheet of glass. The sealant strip application system 10 further includes a normally open switch 100 mounted on the handle 55 which switch 100 is associated with the selective coupling components 80 and the selective strip applying components 51. The switch 100, when open or closed, is capable of providing electrical control signals for controlling pneumatic valve positions which in turn direct air to other components which will be discussed hereinbelow. The valves and the functions that they perform will be better understood during a description of the schematic drawing of FIG. 13. In the mean time, it should be understood that the normally open switch 100 is open to cause deactivation of the rotary brake 86 and the linear brake 88 and activation of the selective strip applying components 51 including the cylinder 62 for the pressure wheel 60 and is closed to cause activation of the rotary brake 86 and the linear brake 88 and deactivation of the selective strip applying components 51.

Figure 6:
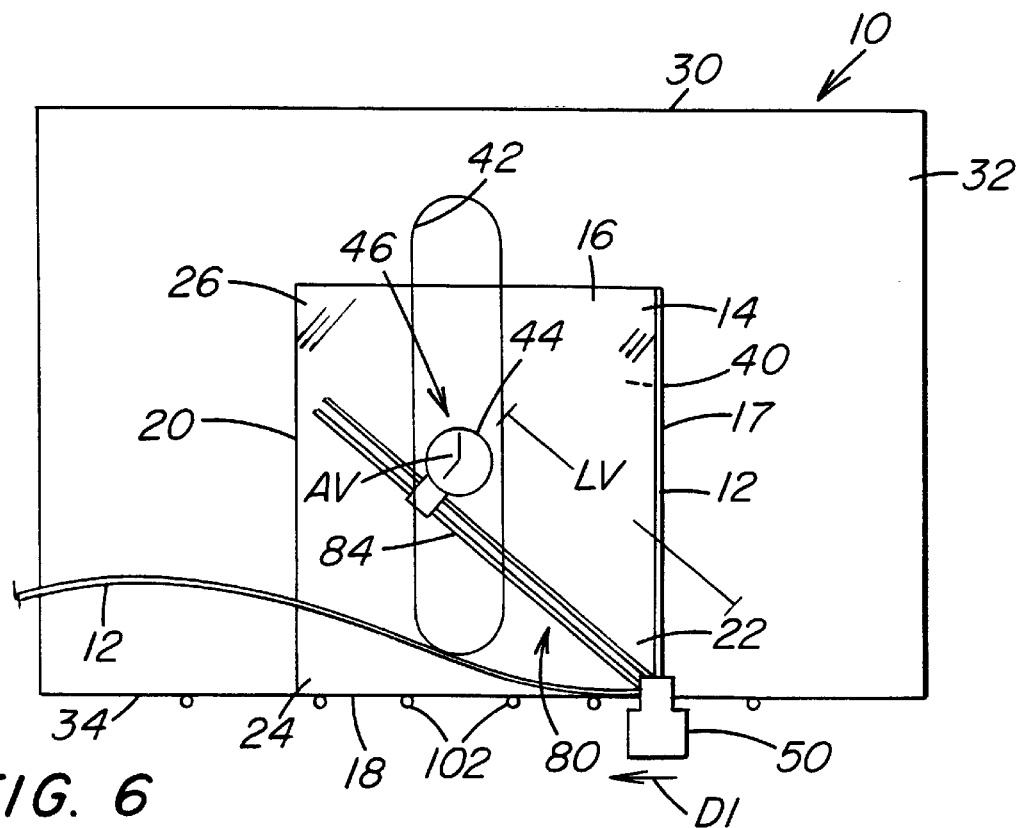
FIG. 6 is a simplified top view of the preferred system with the components in a position for applying the strip to one edge of a sheet of glass.

It is appropriate to describe the overall operation of the system 10 in order to fully understand how the strip 12 is to be applied to the sheet of glass 16. The description will primarily refer to the simplified views of the preferred system 10 in FIGS. 6 through 12. As seen in FIG. 6, the applicator 50 is for being initially positioned at the first corner 22 of the sheet of glass 16 when the first edge 18 is parallel to and in alignment with the front edge 34 of the support table 30. Although the application of the strip 12 could be begun on the first edge 18, in the configuration of FIG. 6, the strip 12 has already been applied to the adjacent edge 17 up to the corner 22. With the switch 100 open, the selective coupling components 80 are for being deactivated and the selective strip applying components 51 are for being activated when the sealant strip applicator 50 is positioned at the first corner 22. The sealant strip applicator 50 is for being moved relative to the front edge 34 of the support table 30 in the first direction D1 from the first corner 22 toward the second corner 24 of the sheet of glass 16 as the sealant strip 12 is applied to the surface 14 adjacent to the first edge 18 when the selective coupling components 80 are deactivated and the selective strip applying components 51 are activated. In this condition, there is a variable length LV of the connecting rod element 84 between the applicator 50 and the vacuum cup device 44 and there is a variable angle AV from the vacuum cup 44 to the applicator 50. The switch 100 being open also causes the cylinder 62 to create a downward force on the pressure wheel 60 to apply the strip 12.

Additionally, as best seen in FIGS. 2 and 6 and generally in FIG. 1, the switch 100 being open causes a plurality of selective alignment retaining components 102 in the form of wheels to be move by cylinders 104 toward the front edge 34. The support table 30 includes the selective alignment retaining components 102 for retaining the first edge 18 of the sheet of glass 16 parallel to and in alignment with the front edge 34 when the sealant strip applicator 50 is being moved in the first direction D1 and for allowing the rotation of the sheet of glass 16 when the sealant strip applicator 50 is being moved in the second direction D2. The preferred selective alignment retaining components 102 include a squaring gate having a plurality of wheels that can be manually repositioned by cylinders 104 (FIG. 2) along a line parallel with the front edge 34 depending on the dimensions of the sheet of glass and the eventual location of the corners thereof during the application of the strip 12. The selective alignment retaining components 102 are disposed adjacent the front edge 34 for making contact with the first edge 18 of the sheet of glass 16 at separated locations therealong when the sealant strip applicator 50 is moved in the first direction D1 and for being disposed outwardly of and separated from the front edge 34 when the sealant strip applicator 50 is being moved in the second direction D2 as shown in FIGS. 8 and 9.

Figure 7:
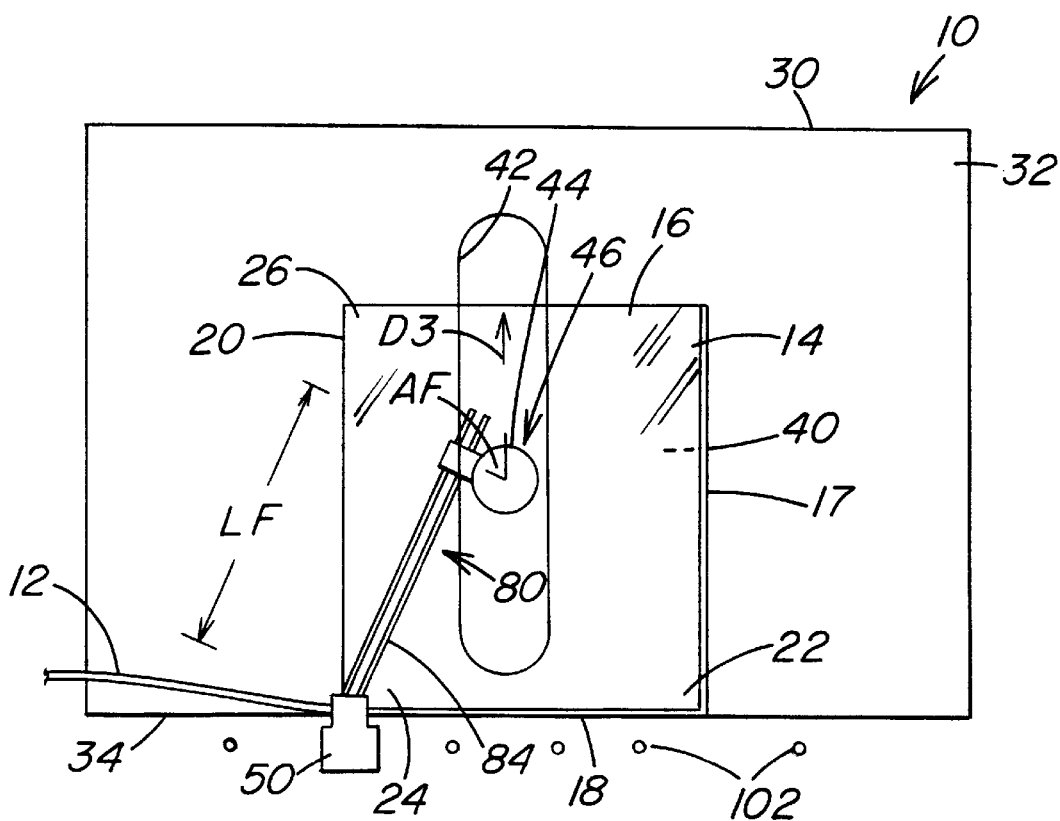
FIG. 7 is a view like that of FIG. 6 after the strip has been applied to the one edge.

As seen in FIG. 7, the sealant strip applicator 50 is positioned at the second corner 24 of the sheet of glass 16 after the application of the sealant strip 12 along the first edge 18 of the sheet of glass. For an accurate positioning at the corner 24, the applicator 50 can be provided a laser or other high intensity light device adjustably mounted thereon to visually assist in the positioning. Specifically, the laser device can be directed to point toward and to light the second edge 20 of the sheet of glass 16. The laser device is preferably adjusted to cause the light to be positioned on the edge 20 when the bending pin 58R and the pivot pin 94 are aligned on a bisecting line at the corner 24. Additionally, it should be noted that it would be possible, by those skilled in the art, to utilize some other type of physical detector means to automatically sense the location of the applicator 50 relative to the edge 20 of the sheet of glass 16 and to provide a means for automatically stopping the movement of the applicator when the desired position is obtained.

In any case, the selective coupling components 80 are for being activated and the selective strip applying components 51 are for being deactivated when the sealant strip applicator 50 is positioned at the second corner 24 with the bending pin 58R and the pivot pin 94 aligned on the bisecting line of the corner 24 and each subsequent corner during the application process. To produce this condition, the switch 100 is closed to cause the linear brake portion 88 and the rotary brake portion 86 to be activated. The fixed relationship between the vacuum cup device 44 and the applicator 50 is established to produce a fixed length LF of the connecting rod element 84 between the applicator 50 and the vacuum cup device 44 and a fixed angle AF from the vacuum cup 44 to the applicator 50. The sealant strip applicator 50 is for being moved in a second direction D2 opposite the first direction D1 relative to the front edge 34, after activation of the selective coupling components 80 and deactivation of the selective strip applying components 51, to cause the vacuum cup device 44 to rotate the sheet of glass 16 on the upper surface 32 of the support table 30 about the central region 46 until the second edge 20 is in general alignment with the front edge 34 of the support table 30.

Figure 8:
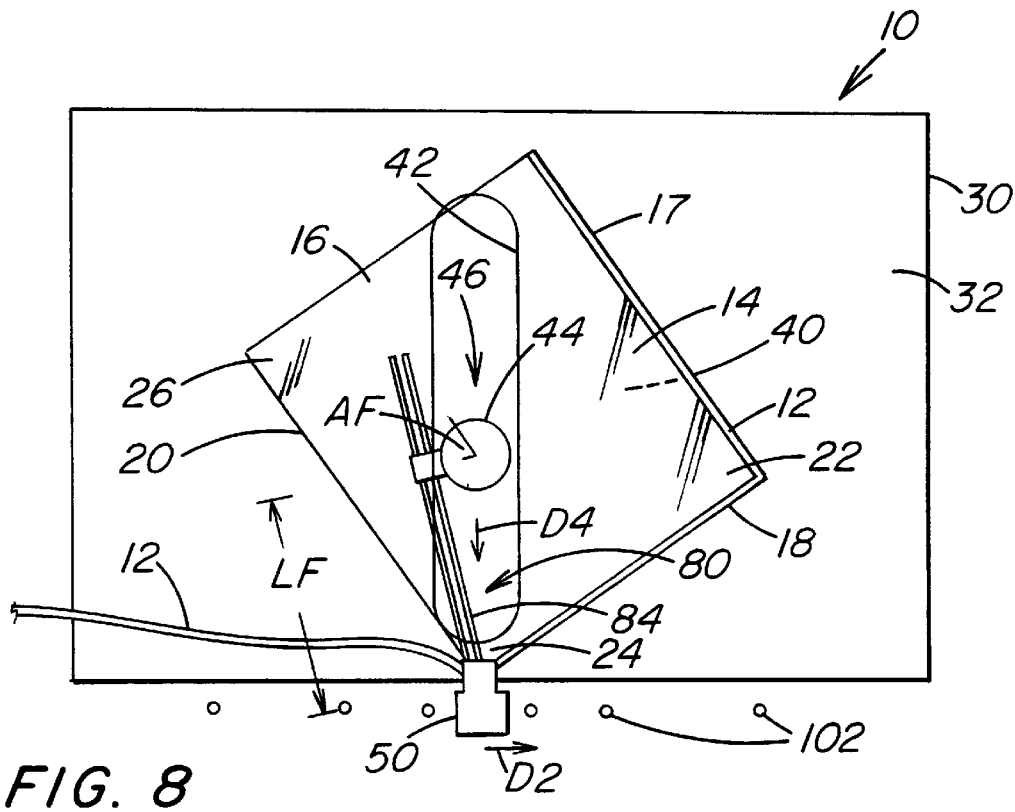
FIG. 8 is a view like that of FIG. 7 as the sheet of glass is being rotated prior to the application of the strip to the next edge of the sheet of glass.
Figure 9:
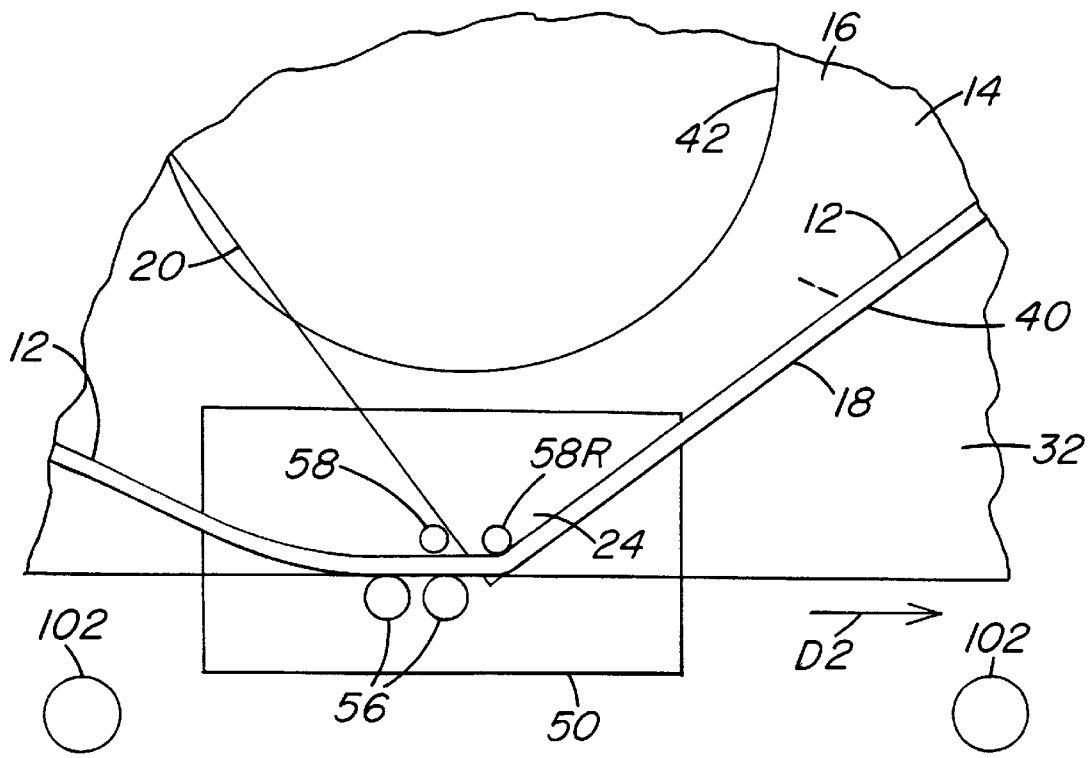
FIG. 9 is an enlarged view of the bending area of the applicator when it is in the position of FIG. 8.
Figure 10:
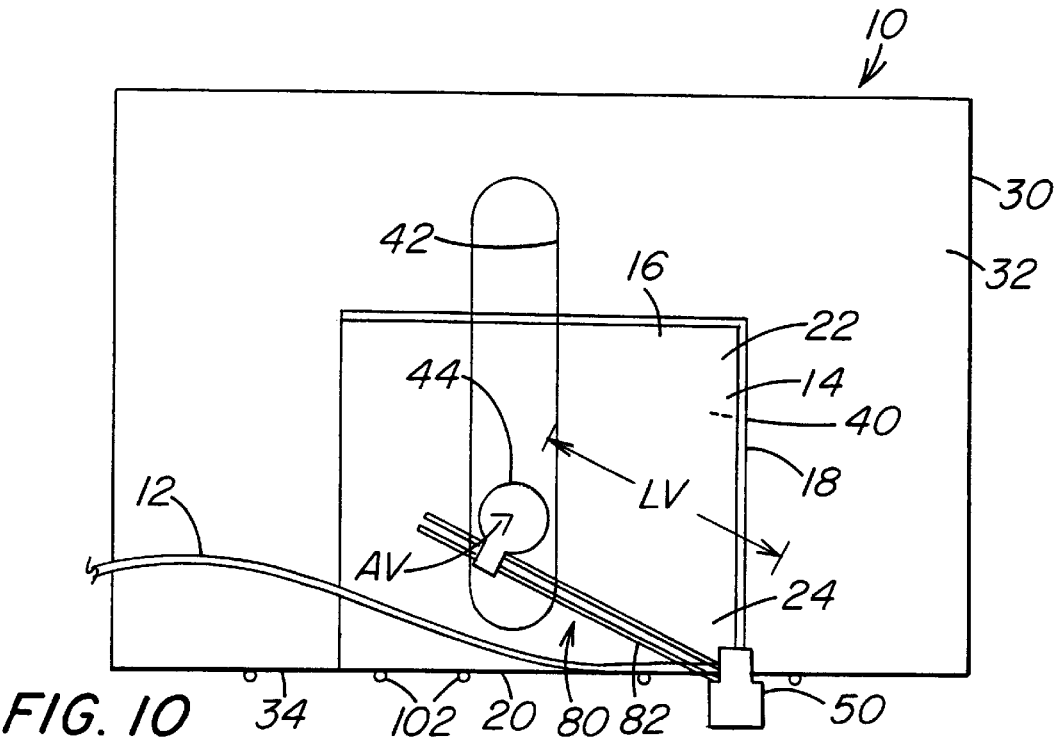
FIG. 10 is a view like that of FIG. 8 wherein the applicator is in a position to apply the strip to the next edge of the sheet of glass.

As seen by a comparison of FIGS. 7, 8 and 10, during the movement in the second direction D2 and with the fixed length LF and fixed angle AF, the vacuum cup device 44 initially moves in a third direction D3 along the elongated opening 42 away from the front edge 34 and then moves in a fourth direction D4, opposite the third direction D3, along the elongated opening 42 toward the front edge 34. As seen in FIG. 10, the selective coupling components 80 are for being deactivated and the selective strip applying components 51 are for being activated when the second edge 20 is parallel to and in alignment with the front edge 34 by the switch 100 being open. The sealant strip applicator 50 is repositioned to the right at the second corner 24 for being moved again relative to the front edge 34 of the support table 30 in the first direction D1 toward the third corner 26 of the sheet of glass 16 for the application of the sealant strip 12 to the surface 14 of the sheet of glass 16 adjacent to and along the second edge 20. The opening of the switch 100 again allows a variable length LV and a variable angle AV of the applicator 50 with respect to the vacuum cup device 44.

As seen in FIG. 9, during the movement of the applicator 50 in the second direction D2, the bending pin 58R bends the sealant strip 12 at the second corner 24 of the sheet of glass 16. The bending begins as soon as the applicator 50 begins to move in the second direction D2 and continues until it is located to the right as seen in FIG. 10.

From the description of FIGS. 6 through 10 provided above, it should be clear that the sheet of glass 16 should be positioned with the center region 46 thereof over the vacuum cup device 44. The sealant strip applicator 50 is positioned to the right in alignment with the first corner 22. The switch 100 is open and the handle 55 is used to move the applicator 50 in the first direction D1 to apply the strip 12 to the first edge 18. When the applicator 50 is located at the second corner 24, the switch 100 in closed to establish a fixed relationship between the applicator 50 and the vacuum cup device 44. Additionally, the selective alignment retaining components 102 are retracted from the front edge 34 of the table 30 and the air supply system 31 is activated to allow the sheet of glass 16 to move about on the upper surface 32 of the support table 30. With the switch 100 being held in the closed position, the applicator 50 is moved in the second direction D2. The fixed relationship between the applicator 50 and the vacuum cup device 44 causes the sheet of glass 16 to rotate until the second corner 24 is positioned to the right and the second edge 20 is generally aligned with the front edge 34. Throughout the movement in the second direction D2, the bending pin 58R insures that the strip 12 is tightly bent at the second corner 24 and in a proper position for the application of the strip 12 to the second edge 20. With the switch 100 open, the selective alignment retaining components 102 will be moved inwardly, the air supply system 31 will be repositioned to prevent movement of the sheet of glass 16 and the vacuum cup device 44 will be uncoupled from the applicator 50 to insure that the sheet of glass 16 is again in position for applying the strip 12 to the second edge 20 by the movement of the applicator 50 in the first direction D1.

Although the operation of the system 10 though the opening and closing of the switch 100 tends to control the movement of the sheet of glass 16 and the application of the strip 12 to each edge of the sheet of glass 16, the repeated movements of the applicator 50 are manual by the use of the handle 55. The preferred sealant strip application system 10 does not require the skill or attention, as was discussed hereinabove for the prior art devices, that was heretofore needed to insure that the strip was properly applied to the edges of the sheet of glass. However, with the manual movement of the applicator 50 which produces repeated rotation of the sheet of glass, there is some concern that the operator will become tired. Accordingly, the preferred sealant strip application system 10 is provided means for assisting the movement of the vacuum cup device 44 during the movement of the applicator 50 in the second direction D2. As best seen in FIGS. 1 and 5, the preferred sealant strip application system 10 includes vacuum cup biasing means 120 for initial biasing the movement of the vacuum cup device 44 and the central region 46 of the sheet of glass 16 in the third direction D3 (FIG. 7) along the elongated opening 42 away from the front edge 34 and for subsequently biasing the movement of the vacuum cup device 44 and the central region 46 of the sheet of glass 46 in the fourth direction D4 along the elongated opening 42 toward the front edge 32. The vacuum cup biasing means 120 includes a rodless cylinder 122 that is mounted in the lower region 76 of the table 30 to extend perpendicular to the front edge 34. A fitting 124 on the carriage 70 is mounted for movement tending to follow the movement of the rodless cylinder 122. The coupling between the fitting 124 and the rodless cylinder 122 is not rigid but will nevertheless tend to bias the carriage 70 of the vacuum cup device 44 in response to the movement of the rodless cylinder 122.

The vacuum cup biasing means 120 will also be activated by the closing of the switch 100. When the switch 100 is open, there will be no control air provided to the rodless cylinder 122 and the vacuum cup device 44 will remain in a fixed position in the elongated opening 42. However, with the closing of the switch 100, control air to the rodless cylinder 122 will begin the initial biasing of the movement of the vacuum cup device 44 in the third direction D3. To reverse the direction of the biasing of the vacuum cup device 44 when it is positioned at the position shown in FIG. 8, there is a need to discontinue the initial biasing and to begin the subsequent biasing in the opposite direction of the rodless cylinder 122 for the movement in the fourth direction D4. This reversal of direction should occur when the sealant strip applicator 50 is located, as generally shown in FIG. 8, along the front edge 34 in perpendicular alignment with the vacuum cup device 44 during the movement of the sealant strip applicator 50 in the second direction D2. The direction of the supply air to the rodless cylinder 122 will be reversed by the used of a proximity switch 126 (FIG. 1) that is disposed below the front edge 34 of the support table 30 to sense when the sealant strip applicator 50 is located along the front edge 34 in perpendicular alignment with the vacuum cup device 44. When the applicator 50 is positioned to the right for applying the strip 12 to the next edge of the sheet of glass 16, the switch 100 will be open and the air to the rodless cylinder 122 is discontinued to prevent any biasing of the vacuum cup device 44.

Figure 13:
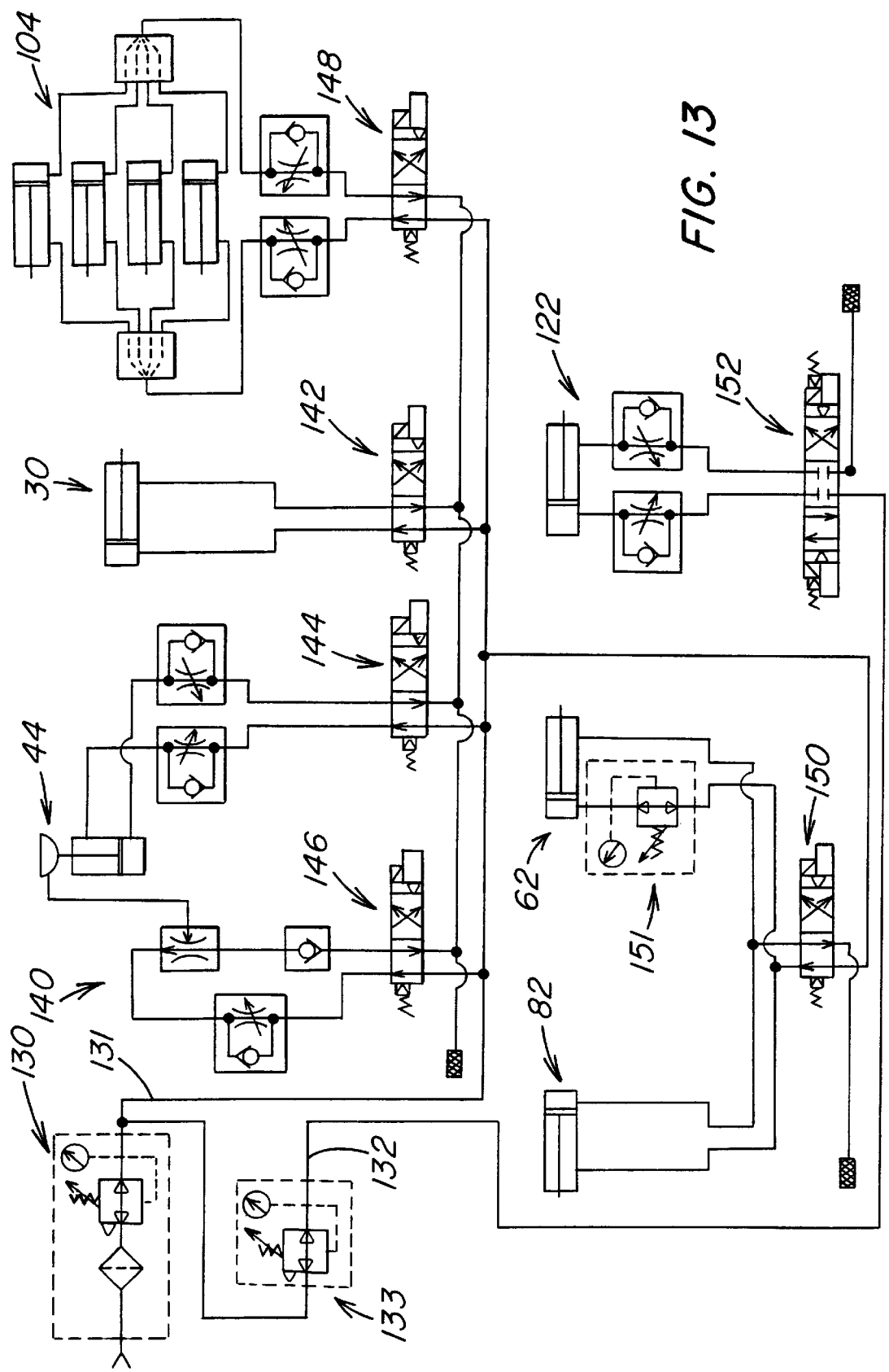
FIG. 13 is a schematic diagram of the control system for the preferred sealant strip application system including various features of the invention.

As seen in FIG. 13, a schematic drawing of the pneumatic system and controls 140 of the preferred sealant strip application system 10 includes an air supply 130 through a supply line 131 which is expected to be at about 80 psi. A branch supply line 132 includes regulator 133 set at about 30 psi. The pneumatic system and controls 140 can include various pressure regulators and flow control valves that are well known in the control art to insure the desired operation of the various components. Each of the flow control valves includes one side connected to an air supply line and a discharge side that is capable of venting to atmosphere. The valves 142, 144, 146, 148 and 150 are connected to the 80 psi air supply line 131 while the valve 152 is connected to the 30 psi branch supply line 132.

The valve 142 is a two position valve activated to provided air to the air flotation table 30 to assist in the movement of the sheet and to prevent any scratching or damage thereto and to hold it in place when the sealant strip 12 is being applied. Similarly, the vacuum cup 44 will be raised by the activation of the valve 144 when a sheet is installed on the table 30 and activation of the valve 146 will produce the gripping force on the central region 46 of the sheet of glass throughout the application of the sealant strip 12 thereto.

Valves 148, 150 and 152 are all controlled by the opening and the closing of the switch 100. When the switch 100 is open, the valve 148 moves the alignment retaining components 102 toward the front edge 34. The valve 150 is positioned to apply a downward force to the cylinder 62 pressure wheel 60 and to deactivate the air to the oil reservoir of the the suction cup fitting 82. The line to the cylinder 62 includes a regulator 151 which is set at about 60 psi to insure its proper operation. At the same time the switch 100 is opened, the valve 152 is positioned to deactivate the rodless cylinder 122. The valves 148, 150 and 152 are respectively repositioned by the opening of the switch 100 to cause the cylinders 104 to position the alignment retaining components 102 away from the front edge 34; to activate the suction cup fitting 82 and to cause the cylinder 62 to raise the pressure wheel 60; and to activate the rodless cylinder 122. When the switch 100 is closed, the valve 150 will activate the suction cup fitting 82, as the supply air increases the pressure of the oil therein, to establish the fixed relationship between the vacuum cup device 44 and the applicator 50 to allow the controlled repositioning of the sheet of glass 16 on the upper surface 32 of the support table 30 and will deactivate the pressure wheel 60 to prevent it from applying the strip 12. With the switch 100 closed, the valve 148 would retract the alignment retaining components 102 to allow the rotation of the sheet of glass 16. The valve 158 would be activated to direct some air to the rodless cylinder 122 for biasing in one direction until activation by the switch 126 causes the direction of the air to be reversed for biasing in the other direction.

Figure 11:
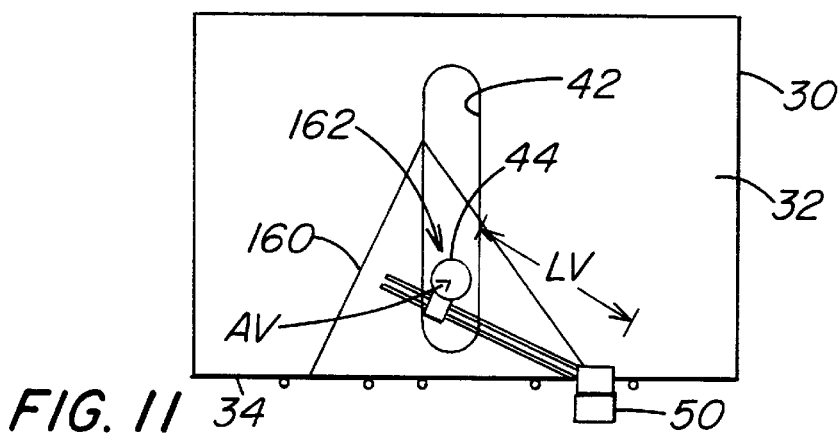
FIG. 11 is a view of the system like that of FIG. 6 for applying a strip to a triangular sheet of glass.
Figure 12:
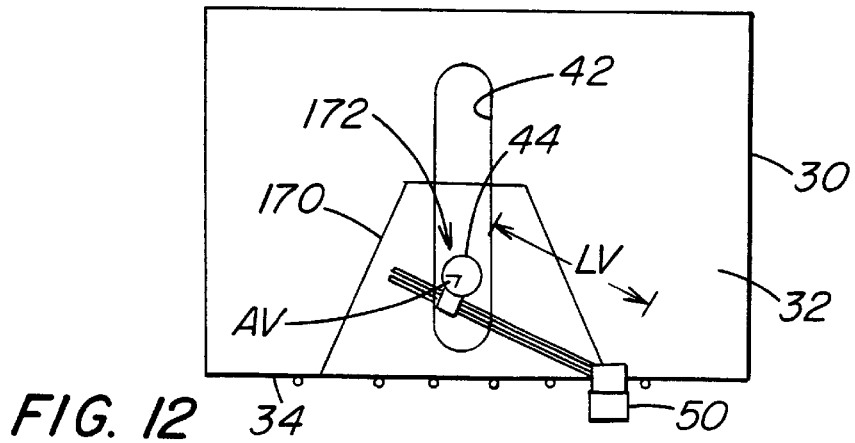
FIG. 12 is a view of the system like that of FIG. 6 for applying a strip to a trapezoidal sheet of glass.

It should be clear that the preferred strip application system 10 can be conveniently and reliably employed to apply a sealant strip 12 to various sizes of rectangular sheets of glass. However, it may not be as obvious that the system 10 will work just as effectively and reliably for the application of the strips to other sheets of glass that include a plurality of straight edges but that have any number of different shapes. For example, as seen in FIG. 11, a triangular sheet of glass 160 can be installed on the support table 30 for the application of the strip by the applicator 50 in the same manner as described above. The primary condition which assures that the system can be used for the triangular sheet of glass 160 is the proper initial location of the vacuum cup device 44 at the central region 162 of the sheet of glass 160. Similarly, as seen in FIG. 12, a trapezoidal sheet of glass 170 can be installed on the table 30 with the central region 172 thereof on the vacuum cup device 44 to facilitate the bending of the strip at each corner and the application of the strip to each edge thereof in the same manner as with a rectangular sheet of glass. The use of the switch 100 will again establish a fixed relationship between the applicator 50 and the vacuum cup device 44 at each corner of the sheets of glass 160 and 170 as they are rotated to align the next edge of the glass with the front edge 34 of the support table 30 for the application of the strip thereto. Because of the different angles at the corners of the sheets of glass 160 and 170, the laser device could not be specifically pointed to light the edges thereof but might be generally employed by the operator to assist in the positioning of the applicator at the corners prior to closing the switch 100.

It should be clear that those skilled in the art could provide any number of alterations to the preferred embodiment of the invention as described hereinabove without departing from the scope of the invention as claimed.

What is claimed is:

1. A sealant strip application system for applying a sealant strip to a surface of a sheet of glass adjacent to a plurality of straight edges of the sheet of glass, each adjacent pair of the plurality of edges intersecting at a corner, the plurality of edges of the sheet of glass including a first edge and an adjacent second edge, the first edge having a first corner at a terminal end thereof and a second corner at the other terminal end thereof, and the second edge having the second corner at a terminal end thereof adjacent the first edge and a third corner at the other terminal end thereof, said sealant strip application system comprising:

a support table having an upper surface and a straight front edge;

said upper surface for supporting the sheet of glass at a lower surface thereof which is opposite the surface;

said upper surface having an elongated opening therethrough which said elongated opening extends at an angle with respect to said front edge of said support table;

a vacuum cup device mounted relative to said support table to extend through said elongated opening in alignment with said upper surface and for movement along said elongated opening toward and away from said front edge;

gripping vacuum means for being selectively applied by said vacuum cup device to the lower surface of the sheet of glass for gripping the sheet of glass in a central region thereof without allowing any relative movement between said vacuum cup device and the sheet of glass throughout the application of the sealant strip to the surface of the sheet of glass;

a sealant strip applicator mounted on said support table for movement along said front edge;

means for feeding the sealant strip to said sealant strip applicator;

said sealant strip applicator having selective strip applying means for being activated to apply the sealant strip to the surface of the sheet of glass and for being deactivated to discontinue the application of the sealant strip to the surface of the sheet of glass;

a variable coupling element between said sealant strip applicator and said vacuum cup device;

said variable coupling element including selective coupling means for being activated to establish a fixed distance of said sealant strip applicator from said vacuum cup device and a fixed direction of said sealant strip applicator from said vacuum cup device and for being deactivated to allow a variable distance and a variable direction of said sealant strip applicator from said vacuum cup device;

said sealant strip applicator for being initially positioned at the first corner of the sheet of glass when the first edge is parallel to and in alignment with said front edge of said support table;

said selective coupling means for being deactivated and said selective strip applying means for being activated when said sealant strip applicator is positioned at the first corner;

said sealant strip applicator for being moved relative to said front edge of said support table in a first direction from the first corner toward the second corner of the sheet of glass as the sealant strip is applied to the surface adjacent to the first edge when said selective coupling means is deactivated and said selective strip applying means is activated;

said sealant strip applicator for being positioned at the second corner of the sheet of glass after the application of the sealant strip along the first edge of the sheet of glass;

said selective coupling means for being activated and said selective strip applying means for being deactivated when said sealant strip applicator is positioned at the second corner;

said sealant strip applicator for being moved in a second direction opposite said first direction relative to said front edge, after activation of said selective coupling means and deactivation of said selective strip applying means, to cause said vacuum cup device to rotate the sheet of glass on said upper surface of said support table about the central region until the second edge is in general alignment with said front edge of said support table as said vacuum cup device initially moves along said elongated opening away from said front edge and then moves along said elongated opening toward said front edge; and said selective coupling means for being deactivated and said selective strip applying means for being activated when the second edge is parallel to and in alignment with said front edge and said sealant strip applicator is positioned at the second corner for being moved relative to said front edge of said support table in said first direction toward the third corner of the sheet of glass for the application of the sealant strip to the surface of the sheet of glass adjacent to and along the second edge.

2. The sealant strip application system according to claim 1, wherein said sealant strip applicator includes bending pin means extending toward the surface of the sheet of glass in a direction generally perpendicular thereto at a side of the sealant strip away from said front edge of said support table and said bending pin means is for bending the sealant strip at the second corner of the sheet of glass as the sealant strip applicator is moved in said second direction.

3. The sealant strip application system according to claim 1, wherein said sealant strip applicator includes handle means for moving said sealant strip applicator in said first and said second directions.

4. The sealant strip application system according to claim 1, further including a normally open switch associated with said selective coupling means and said selective strip applying means, said normally open switch being open to cause deactivation of said selective coupling means and activation of said selective strip applying means and said normally open switch for being closed to cause activation of said selective coupling means and deactivation of said selective strip applying means.

5. The sealant strip application system according to claim 4, wherein said sealant strip applicator includes selective pressure means for selectively applying a downward pressure to the sealant strip to assist in the application of the sealant strip to the surface of the sheet of glass and said normally open switch is open to causes said downward pressure and is for being closed to prevent said downward pressure by said selective pressure means.

6. The sealant strip application system according to claim 4, wherein said support table includes selective alignment retaining means for retaining the first edge of the sheet of glass parallel to and in alignment with said front edge when said sealant strip applicator is being moved in said first direction and for allowing the rotation of the sheet of glass when said sealant strip applicator is being moved in said second direction.

7. The sealant strip application system according to claim 6, wherein said selective alignment retaining means includes a squaring gate disposed adjacent said front edge for making contact with the first edge of the sheet of glass at separated locations therealong when said sealant strip applicator is moved in said first direction and for being disposed outwardly of and separated from said front edge when said sealant strip applicator is moved in said second direction.

8. The sealant strip application system according to claim 4, wherein said sealant strip applicator includes handle means for moving said sealant strip applicator in said first and said second directions and said normally open switch is located on said sealant strip applicator adjacent to said handle means.

9. The sealant strip application system according to claim 1, further including vacuum cup biasing means for initial biasing said movement of said vacuum cup device and the central region of the sheet of glass in a third direction along said elongated opening away from said front edge and for subsequently biasing said movement of said vacuum cup device and the central region of the sheet of glass in a fourth direction opposite said third direction along said elongated opening toward said front edge.

10. The sealant strip application system according to claim 9, wherein said elongated opening extends perpendicular to said front edge, said third and said fourth directions are perpendicular to said first and said second directions, and further including control means for said vacuum cup biasing means for beginning said initial biasing of said movement in said third direction when said selective coupling means is activated, for discontinuing said initial biasing and beginning said subsequent biasing of said movement in said fourth direction when said sealant strip applicator is located along said front edge in perpendicular alignment with said vacuum cup device during said movement of said sealant strip applicator in said second direction, and for discontinuing said subsequent biasing when said selective coupling means is deactivated.

11. The sealant strip application system according to claim 10, wherein said control means includes a proximity switch disposed below said front edge of said support table to sense when said sealant strip applicator is located along said front edge in said perpendicular alignment with said vacuum cup device.

12. The sealant strip application system according to claim 1, wherein said selective coupling means includes a vacuum cup fitting in a lower region of said support table opposite said upper surface and connecting rod means extending from said sealant strip applicator to said vacuum cup fitting in said lower region of said support table, said vacuum cup fitting having a rotary brake portion for selective rotation thereof relative to said vacuum cup device and a linear brake portion, said connecting rod means having an applicator end and a vacuum cup end, said applicator end being pivotally joined to said sealant strip applicator at a lower portion thereof below said upper surface and said front edge of said support table, said vacuum cup end being mounted for selective linear movement within said linear brake portion of said vacuum cup fitting, said rotary brake portion being activated to prevent said selective rotation of said vacuum cup fitting relative to said vacuum cup device and said linear brake portion being activated to prevent said selective linear movement of said vacuum cup end of said connecting rod means within said linear brake portion during said activation of said selective coupling means.

13. The sealant strip application system according to claim 12, further including a normally open switch associated with said selective coupling means and said selective strip applying means, said normally open switch being open to cause deactivation of said rotary brake portion and said linear brake portion of said vacuum cup fitting and activation of said selective strip applying means and said normally open switch for being closed to cause activation of said rotary brake portion and said linear brake portion of said vacuum cup fitting and deactivation of said selective strip applying means.

14. The sealant strip application system according to claim 13, wherein said sealant strip applicator includes handle means for moving said sealant strip applicator in said first and said second directions and said normally open switch is located on said sealant strip applicator adjacent to said handle means.

15. A sealant strip application system for applying a sealant strip to a surface of a sheet of glass adjacent to a plurality of straight edges of the sheet of glass, each adjacent pair of the plurality of edges intersecting at a corner, the plurality of edges of the sheet of glass including a first edge and an adjacent second edge, the first edge having a first corner at a terminal end thereof and a second corner at the other terminal end thereof, and the second edge having the second corner at a terminal end thereof adjacent the first edge and a third corner at the other terminal end thereof, said sealant strip application system comprising:

a support table having an upper surface and a straight front edge;

said upper surface for supporting the sheet of glass at a lower surface thereof which is opposite the surface;

said upper surface having an elongated opening therethrough which said elongated opening extends at an angle with respect to said front edge of said support table;

a vacuum cup device mounted relative to said support table to extend through said elongated opening in alignment with said upper surface and for movement along said elongated opening toward and away from said front edge;

gripping vacuum means for being selectively applied by said vacuum cup device to the lower surface of the sheet of glass for gripping the sheet of glass in a central region thereof without allowing any relative movement between said vacuum cup device and the sheet of glass throughout the application of the sealant strip to the surface of the sheet of glass;

a sealant strip applicator mounted on said support table for movement along said front edge;

means for feeding the sealant strip to said sealant strip applicator;

said sealant strip applicator having selective strip applying means for being activated to apply the sealant strip to the surface of the sheet of glass and for being deactivated to discontinue the application of the sealant strip to the surface of the sheet of glass;

a variable coupling element between said sealant strip applicator and said vacuum cup device;

said variable coupling element including selective coupling means for being activated to establish a fixed distance of said sealant strip applicator from said vacuum cup device and a fixed direction of said sealant strip applicator from said vacuum cup device and for being deactivated to allow a variable distance and a variable direction of said sealant strip applicator from said vacuum cup device;

said sealant strip applicator for being initially positioned at the first corner of the sheet of glass when the first edge is parallel to and in alignment with said front edge of said support table;

said selective coupling means for being deactivated and said selective strip applying means for being activated when said sealant strip applicator is positioned at the first corner;

said sealant strip applicator for being moved relative to said front edge of said support table in a first direction from the first corner toward the second corner of the sheet of glass as the sealant strip is applied to the surface adjacent to the first edge when said selective coupling means is deactivated and said selective strip applying means is activated;

said sealant strip applicator for being positioned at the second corner of the sheet of glass after the application of the sealant strip along the first edge of the sheet of glass;

said selective coupling means for being activated and said selective strip applying means for being deactivated when said sealant strip applicator is positioned at the second corner;

said sealant strip applicator for being moved in a second direction opposite said first direction relative to said front edge, after activation of said selective coupling means and deactivation of said selective strip applying means, to cause said vacuum cup device to rotate the sheet of glass on said upper surface of said support table about the central region until the second edge is in general alignment with said front edge of said support table as said vacuum cup device initially moves along said elongated opening away from said front edge and then moves along said elongated opening toward said front edge;

said selective coupling means for being deactivated and said selective strip applying means for being activated when said second edge is parallel to and in alignment with said front edge and said sealant strip applicator is positioned at the second corner for being moved relative to said front edge of said support table in said first direction toward the third corner of the sheet of glass for the application of the sealant strip to the surface of the sheet of glass adjacent to and along the second edge;

said sealant strip applicator including bending pin means extending toward the surface of the sheet of glass in a direction generally perpendicular thereto at a side of the sealant strip away from said front edge of said support table;

said bending pin means for bending the sealant strip at the second corner of the sheet of glass as the sealant strip applicator is moved in said second direction;

a normally open switch associated with said selective coupling means and said selective strip applying means for being open to cause deactivation of said selective coupling means and activation of said selective strip applying means and for being closed to cause activation of said selective coupling means and deactivation of said selective strip applying means; and selective alignment retaining means for retaining the first edge of the sheet of glass parallel to and in alignment with said front edge when said sealant strip applicator is being moved in said first direction and for allowing the rotation of the sheet of glass when said sealant strip applicator is being moved in said second direction.

16. The sealant strip application system according to claim 15, wherein said selective coupling means includes a vacuum cup fitting in a lower region of said support table opposite said upper surface and connecting rod means extending from said sealant strip applicator to said vacuum cup fitting in said lower region of said support table, said vacuum cup fitting having a rotary brake portion for selective rotation thereof relative to said vacuum cup device and a linear brake portion, said connecting rod means having an applicator end and a vacuum cup end, said applicator end being pivotally joined to said sealant strip applicator at a lower portion thereof below said upper surface and said front edge of said support table, said vacuum cup end being mounted for selective linear movement within said linear brake portion of said vacuum cup fitting, said rotary brake portion being activated to prevent said selective rotation of said vacuum cup fitting relative to said vacuum cup device and said linear brake portion being activated to prevent said selective linear movement of said vacuum cup end of said connecting rod means within said linear brake portion during said activation of said selective coupling means.

17. The sealant strip application system according to claim 16, wherein said normally open switch being open to cause deactivation of said rotary brake portion and said linear brake portion of said vacuum cup fitting and said normally open switch being closed to cause activation of said rotary brake portion and said linear brake portion of said vacuum cup fitting and deactivation of said selective strip applying means.

18. The sealant strip application system according to claim 15, further including vacuum cup biasing means for initially biasing said movement of said vacuum cup device and the central region of the sheet of glass in a third direction along said elongated opening away from said front edge and for subsequently biasing said movement of said vacuum cup device and the central region of the sheet of glass in a fourth direction opposite said third direction along said elongated opening toward said front edge.

19. The sealant strip application system according to claim 18, wherein said elongated opening extends perpendicular to said front edge, said third and said fourth directions are perpendicular to said first and said second directions, and further including control means for said vacuum cup biasing means for beginning said initial biasing of said movement in said third direction when said selective coupling means is activated, for discontinuing said initial biasing and beginning said subsequent biasing of said movement in said fourth direction when said sealant strip applicator is located along said front edge in perpendicular alignment with said vacuum cup device during said movement of said sealant strip applicator in said second direction, and for discontinuing said subsequent biasing when said selective coupling means is deactivated.

20. A method of applying a sealant strip to a surface of a sheet of glass adjacent to a plurality of straight edges of the sheet of glass, each adjacent pair of the plurality of edges intersecting at a corner, the plurality of edges of the sheet of glass including a first edge and an adjacent second edge, the first edge having a first corner at a terminal end thereof and a second corner at the other terminal end thereof, and the second edge having the second corner at a terminal end thereof adjacent the first edge and a third corner at the other terminal end thereof, said method comprising the steps of:

supporting the sheet of glass at a lower surface thereof which is opposite the surface on an upper surface of a support table having a straight front edge;

gripping the lower surface of the sheet of glass in a central region thereof to allow limited movement of the central region toward and away from said front edge along a path which is at an angle with respect to said front edge;

mounting a sealant strip applicator on said support table for movement along said front edge;

selectively applying the sealant strip to the surface of the sheet of glass with said sealant strip applicator;

selectively discontinuing the application of the sealant strip to the surface of the sheet of glass by said sealant strip applicator;

selectively coupling said sealant strip applicator and the central region of the lower side of the sheet of glass to establish a fixed distance of said sealant strip applicator from the central region and a fixed direction of said sealant strip applicator from the central region;

selectively uncoupling said sealant strip applicator and the central region of the lower side of the sheet of glass to allow a variable distance and a variable direction of said sealant strip applicator from the central region;

initially positioning said sealant strip applicator at the first corner of the sheet of glass when the first edge is parallel to and in alignment with said front edge of said support table during said selective uncoupling;

initially moving said sealant strip applicator relative to said front edge of said support table in a first direction from the first corner toward the second corner of the sheet of glass during said selectively applying the sealant strip to the surface adjacent to the first edge;

subsequently positioning said sealant strip applicator at the second corner of the sheet of glass after said selectively applying the sealant strip along the first edge of the sheet of glass;

subsequently moving said sealant strip applicator in a second direction opposite said first direction relative to said front edge, during said selectively coupling and said selectively discontinuing the application of the sealant strip, to cause rotating of the sheet of glass around the central region on said upper surface of said support table until the second edge is generally parallel to said front edge of said support table;

said subsequently moving said sealant strip applicator in said second direction initially causing the central region to move along said path away from said front edge and then to move along said path toward said front edge;

bending the sealant strip at the second corner of the sheet of glass during said subsequently moving said sealant strip applicator in said second direction; and repeating the steps of said selectively uncoupling and said selectively applying said sealant strip to the surface of the sheet of glass adjacent to and along the second edge when said sealant strip applicator is positioned at the second corner for repeating said initially moving said sealant strip applicator relative to said front edge of said support table in said first direction toward the third corner when the second edge is parallel to and in alignment with said front edge.

21. The method of applying the sealant strip as set forth in claim 20, further including the step of retaining the first edge of the sheet of glass parallel to and in alignment with said front edge during said initially moving said sealant strip applicator in said first direction.

22. The method of applying the sealant strip as set forth in claim 20, further including the steps of initially biasing the central region of the sheet of glass in a third direction along said path away from said front edge and subsequently biasing the central region of the sheet of glass in a fourth direction opposite said third direction along said path toward said front edge during said subsequently moving said sealant strip applicator in said second direction.

23. The method of applying the sealant strip as set forth in claim 22, wherein said initially biasing the central region in said third direction is perpendicular to said first and said second directions.

24. The method of applying the sealant strip as set forth in claim 20, wherein said step of gripping includes:

providing an elongated opening through said upper surface of said support table which said elongated opening extends along said path at said angle with respect to said front edge of said support table;

mounting a vacuum cup device relative to said support table to extend through said elongated opening in alignment with said upper surface and for movement in said elongated opening along said path toward and away from said front edge; and said gripping of the lower surface of the sheet of glass in the central region being provided by said vacuum cup device without allowing any relative movement between said vacuum cup device and the central region of the sheet of glass throughout said applying the sealant strip to the surface of the sheet of glass and said discontinuing said application of the sealant strip to the surface of the sheet of glass.

25. The method of applying the sealant strip as set forth in claim 24, wherein said step of providing said elongated opening includes extending said elongated opening along said path which is perpendicular to said front edge of said support table.

26. The method of applying the sealant strip as set forth in claim 24, wherein said step of coupling includes:

providing a vacuum cup fitting in a lower region of said support table opposite said upper surface and a connecting rod extending from said sealant strip applicator to said vacuum cup fitting in said lower region of said support table, said vacuum cup fitting having a rotary brake portion for selective rotation thereof relative to said vacuum cup device and a linear brake portion, and said connecting rod having an applicator end and a vacuum cup end;

pivotally joining said applicator end to said sealant strip applicator at a lower portion thereof below said upper surface and said front edge of said support table;

mounting said vacuum end for selective linear movement within said linear brake portion of said vacuum cup fitting; and activating said rotary brake portion to prevent said selective rotation of said vacuum cup fitting relative to said vacuum cup device and activating said linear brake portion to prevent said selective linear movement of said vacuum cup end of said connecting rod within said linear brake portion during said subsequently moving said sealant strip applicator in said second direction.

* * * * *